US012281756B2

(12) United States Patent
Nerat

(10) Patent No.: US 12,281,756 B2
(45) Date of Patent: Apr. 22, 2025

(54) FIRE EXTINGUISHER CHARGING NOZZLE

(71) Applicant: RUSOH Inc., Eau Claire, WI (US)

(72) Inventor: J. R. Nerat, Wallace, MI (US)

(73) Assignee: Rely Innovations, Inc., Eau Claire, WI (US)

( * ) Notice: Subject to any disclaimer, the term of this patent is extended or adjusted under 35 U.S.C. 154(b) by 185 days.

(21) Appl. No.: 18/076,112

(22) Filed: Dec. 6, 2022

(65) Prior Publication Data

US 2023/0175650 A1 Jun. 8, 2023

Related U.S. Application Data

(60) Provisional application No. 63/286,383, filed on Dec. 6, 2021.

(51) Int. Cl.

| | |
|---|---|
| ***A62C 13/76*** | (2006.01) |
| ***A62C 13/64*** | (2006.01) |
| ***F17C 13/04*** | (2006.01) |
| *B67D 7/02* | (2010.01) |

(52) U.S. Cl.

CPC .............. *F17C 13/04* (2013.01); *A62C 13/64* (2013.01); *A62C 13/76* (2013.01); *B67D 7/0294* (2013.01); *F17C 2201/058* (2013.01); *F17C 2270/0754* (2013.01)

(58) Field of Classification Search

CPC ...... A62C 13/64; A62C 13/76; B67D 7/0288; B67D 7/0294; F17C 13/04; F17C 2201/058; F17C 2270/0754

See application file for complete search history.

(56) References Cited

U.S. PATENT DOCUMENTS

| | | | | | |
|---|---|---|---|---|---|
| 2,586,088 | A * | 2/1952 | Reeves | A62C 99/0027 | 239/573 |
| 2,620,038 | A * | 12/1952 | Somers | A62C 13/006 | 169/85 |
| 2,783,846 | A * | 3/1957 | Pujes | A62C 13/003 | 169/80 |
| 3,721,300 | A * | 3/1973 | Becker | A62C 13/003 | 169/74 |
| 7,793,737 | B2 * | 9/2010 | Rouosseau | A62C 13/66 | 169/80 |
| 8,225,825 | B1 * | 7/2012 | Wilhelmi | A62C 13/76 | 141/97 |
| 11,478,670 | B2 * | 10/2022 | Czarnek | A62C 13/64 | |
| 2008/0128145 | A1 * | 6/2008 | Butz | A62C 35/023 | 169/46 |
| 2009/0032272 | A1 * | 2/2009 | Duncan | A62C 13/64 | 220/585 |
| 2017/0259092 | A1 * | 9/2017 | Lalouz | A62C 13/76 | |

FOREIGN PATENT DOCUMENTS

| | | | | |
|---|---|---|---|---|
| CN | 106139463 A | * | 11/2016 | A62C 13/64 |
| DE | 102017008053 A1 | * | 3/2018 | A62C 13/00 |
| JP | 2007037592 A | * | 2/2007 | A62C 13/76 |

OTHER PUBLICATIONS

Machine translation of DE102017008053, all pages (Year: 2018).*

* cited by examiner

*Primary Examiner* — Nicolas A Arnett
(74) *Attorney, Agent, or Firm* — Kenneth A. Smith

(57) ABSTRACT

A recharging nozzle, a fire extinguisher configured with a recharging nozzle, and a method of recharging a pressurized water fire extinguisher using the recharging nozzle where the recharging nozzle is configured to be insertable into an air pressure quick disconnect fitting connected to a source of pressurized air.

19 Claims, 6 Drawing Sheets

FIRE EXTINGUISHER CHARGING NOZZLE

CROSS REFERENCE TO RELATED APPLICATIONS

This application is a non-provisional patent application and claims priority to provisional application Ser. No. 63/286,383 filed Dec. 6, 2021.

TECHNICAL FIELD

The present invention relates generally to systems for and a method of recharging a figure extinguisher which uses pressurized air to expel an extinguishing solution for use in extinguishing fires.

BACKGROUND

There exist various portable fire extinguishers that utilize an extinguishing solution as a fire suppressant. Such extinguishers are referred to as pressurized water extinguishers. Generally these extinguishers are partially filled with water or water and a foaming agent. Once filled with the extinguishing solution, compressed air is added to the extinguisher. When in use, a valve is opened that allows the compressed air to expand and force the water or water and foaming agent from the extinguisher via a hose or nozzle to be directed at the fire. In order to reuse the extinguisher, water or water and a foaming agent are added to a discharged extinguisher and compressed air is reintroduced into the extinguisher. Known extinguishers require a pressurizing valve which is subject to leaks or physical damage or require the use of an adapter which replaces a flexible discharge hose portion of the extinguisher during the recharge process. What is needed is a device for recharging a pressurized water fire extinguisher without the need for pressurizing valve or adapter.

SUMMARY

In exemplary embodiments, a pressurized water extinguisher is equipped with a spray nozzle that is configured to interface with a quick connect air fitting to allow for recharging the extinguisher without the need for an adapter or air valve.

In an exemplary embodiment, a pressurized water extinguisher is re-pressurized by connecting a spray nozzle located at a free end of a discharge hose to a quick connect air fitting which is in turn connected to a source of pressurized air. The pressurized air is applied to the spray nozzle and an operator opens the discharge valve on the fire extinguisher such that pressurized air is allowed to enter the fire extinguisher storage tank. Compressed air is applied until a desired pressure is indicated on a pressure valve of the pressurized water extinguisher.

These and other aspects and implementations are discussed in detail below. The foregoing information and the following detailed description include illustrative examples of various aspects and implementations, and provide an overview or framework for understanding the nature and character of the claimed aspects and implementations. The above summary is not intended to describe each illustrated embodiment or every implementation of the invention. Rather, the embodiments are chosen and described so that other skilled in the art can appreciate and understand the principles and practices of the invention. The drawings provide illustration and a further understanding of the various aspects and implementations, and are incorporated in and constitute a part of this specification.

BRIEF DESCRIPTION OF THE DRAWINGS

These and other features and advantages of the present invention will become better understood with regard to the following description and accompanying drawings in which.

Figure 1:
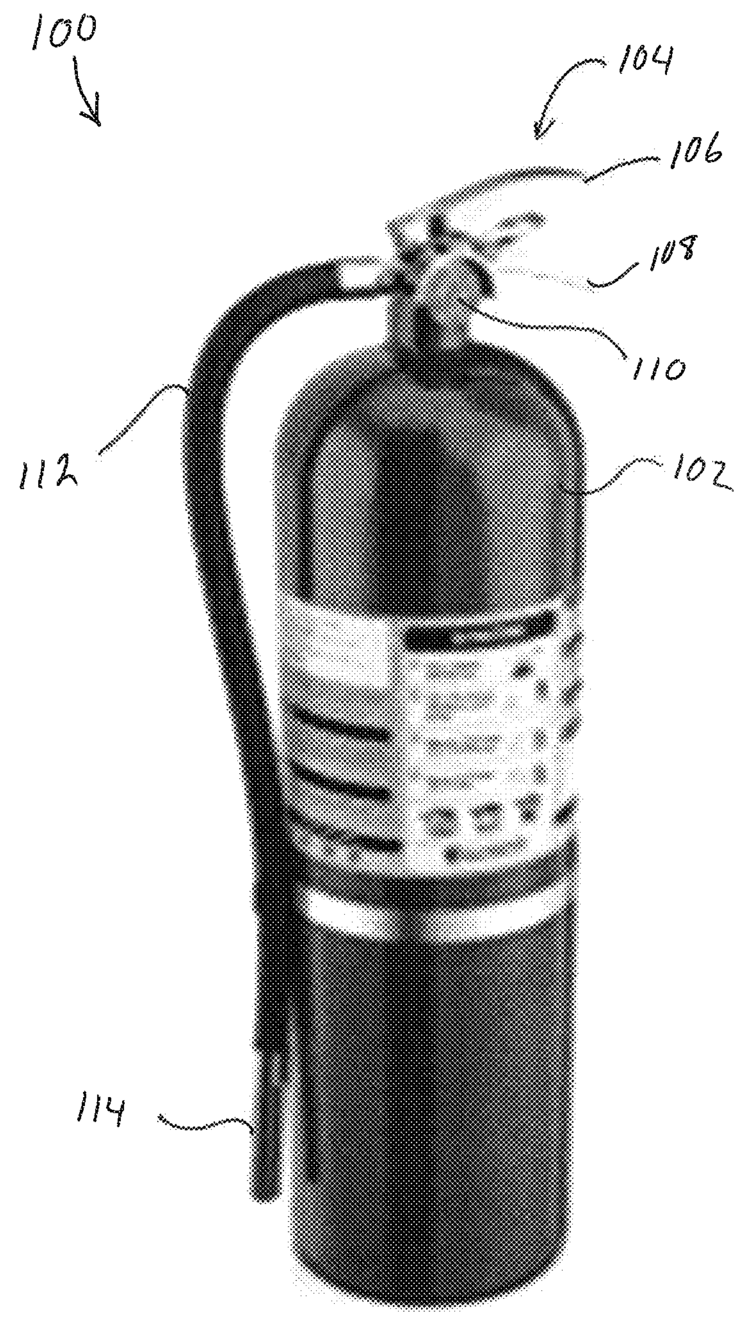
FIG. 1 shows a pressurized water extinguisher according to a known embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

FIG. 1 illustrates a pressurized water fire extinguisher 100 according to a known embodiment. As shown, the pressurized water fire extinguisher 100 includes a storage tank 102 constructed such that an extinguishing solution and pressurized air can be maintained in the storage tank 102 until use. A valve assembly 104 is attached to the storage tank 102 and allows a user to discharge the contents of the tank through a flexible hose 112. The valve assembly 104 is typically attached to the storage tank 102 via a threaded connector (not shown). The valve assembly 104 includes a pressure gauge 110 to indicates the level of air pressure maintained inside the storage tank 102. The valve assembly 104 also includes a handle assembly consisting of a carrying handle 108 and a valve release handle 106. To discharge the pressurized water fire extinguisher 100, a user squeezes the valve release handle 106 towards the carrying handle 108. The result is that a valve portion of the valve assembly 104 opens to allow the air pressure in the storage tank 102 to eject the extinguishing solution from the storage tank 102 through the flexible hose 112 to a discharge nozzle 114 such that the user can direct the water onto a fire to control or extinguish the fire.

Figure 2:
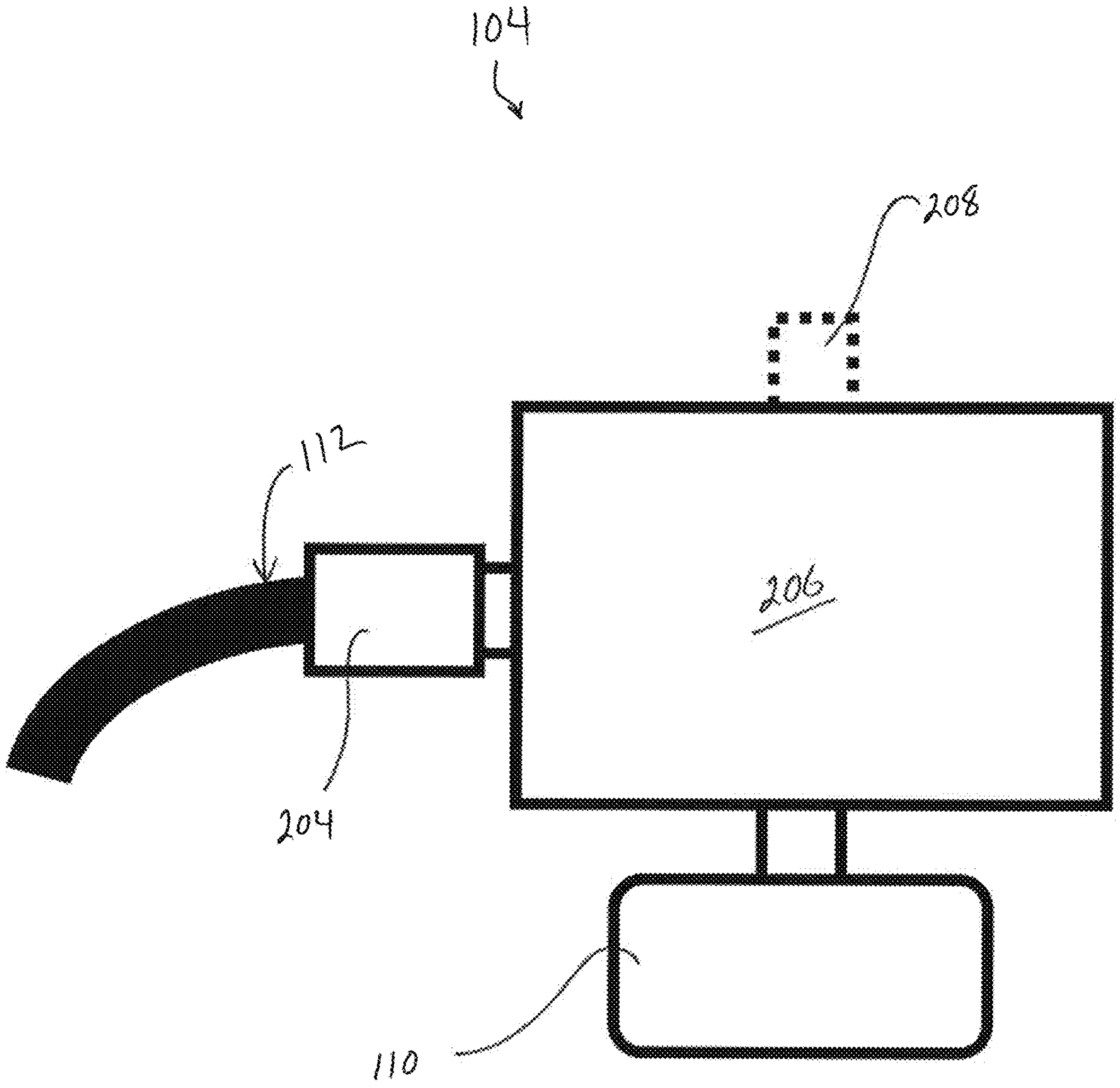
FIG. 2 illustrates a diagram showing a top view of a pressurized water extinguisher valve assembly shown without a carrying or trigger handle to better illustrate certain portions of a known design.

FIG. 2 illustrates a top view of a valve assembly 104 according to an exemplary embodiment. This valve assembly 104 is illustrated without the carrying handle or the valve release handle so that various other features of a valve assembly are clearly visible in the figure. As illustrated, a hose 112 is connected to the valve body 206 with a threaded fitting 204 such that the hose 112 can be removed from the valve body 206 for maintenance. Although shown from a top view, the valve assembly 104 can also include a pressure gauge 110 that is connected to the valve body 206 such that the pressure gauge 110 is in fluid communication with the storage tank 102 and indicates the pressure stored in the interior of the storage tank 102. Also shown is an air pressure valve 208 that is used in some known embodiments to add air pressure to the storage tank 102. This pressure valve 208 is typically a Schrader-type valve and includes a small pin (not shown) that is depressed by a chuck assembly connected to a source of compressed air. Unfortunately, the small pin portion of Schrader valves are subject to damage or leaks over time. The result is that a pressurized water fire extinguisher could gradually lose pressure such that a user may find the fire extinguisher without pressure and thus inoperable when urgently needed.

Figure 3:
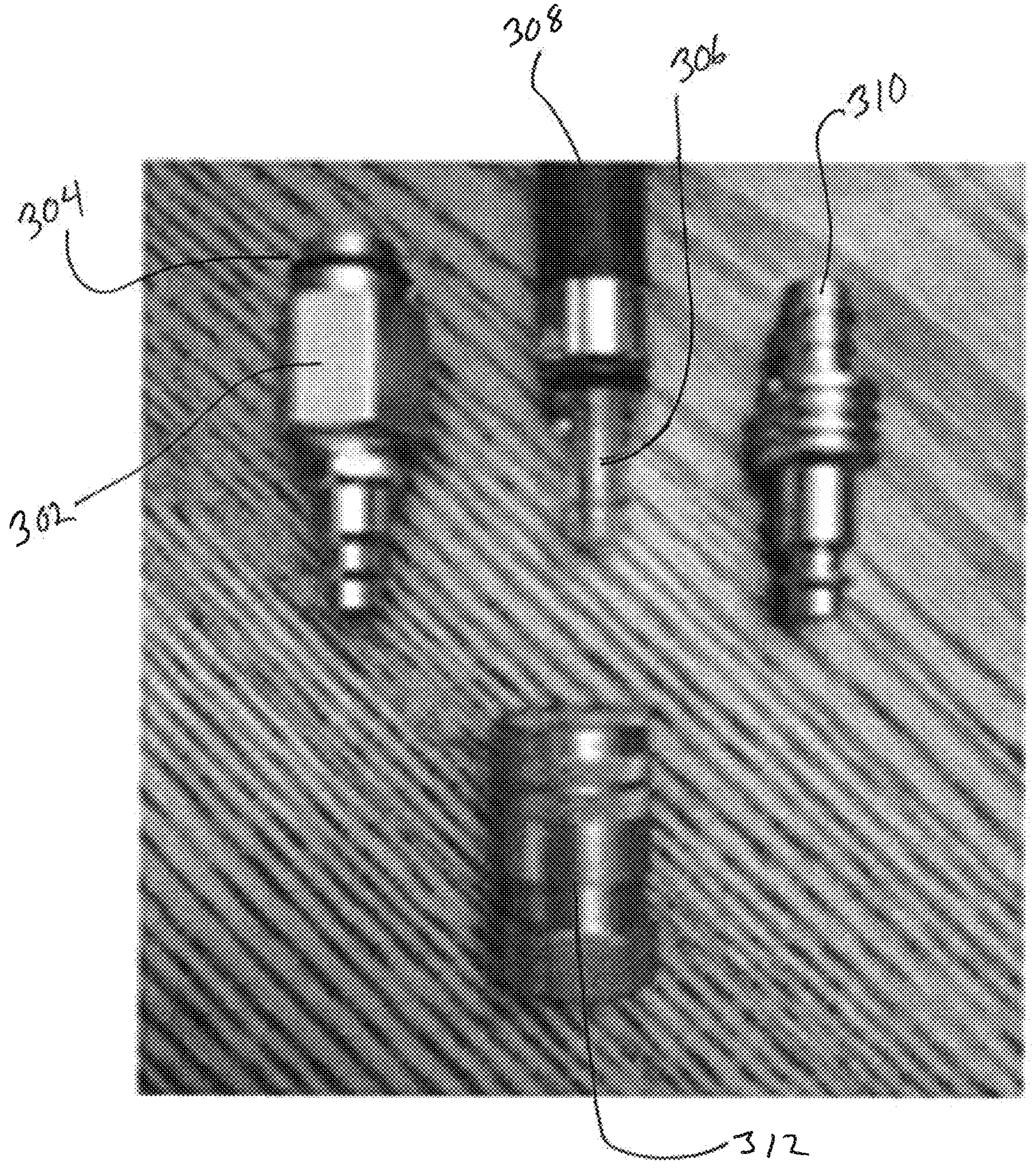
FIG. 3 illustrates nozzle components of a known nozzle, an exemplary embodiment of a charging nozzle, a charging adapter, and a quick connect fitting.

FIG. 3 illustrates an adapter 302 used to add pressure in known designs. The adapter includes a threaded end 304 that is sized to be threaded into the valve body 206 after the hose 112 and threaded fitting 204 are removed from the valve body 206. There are various flaws in this known design, the first being that the adapter 302 is often lost or otherwise not available to a user when a pressurized water fire extinguisher 100 is needed to be recharged. Adapters 302 can also be incorrectly threaded into a valve body 206, damaging the valve body 206, the adapter 302 or both. Also illustrated in FIG. 3 is an example of a known discharge nozzle 306 affixed to a discharge hose 308.

In an exemplary embodiment, rather than requiring an adapter 302 or the use of a Schrader valve integral to the valve body 206, a recharging nozzle is affixed to a discharge hose such that a pressurized water fire extinguisher can be recharged through the discharge hose without requiring that the hose be removed and an adapter be used. An exemplary embodiment of a recharging nozzle according to an exemplary embodiment is shown in FIG. 3 at 310.

Figure 4:
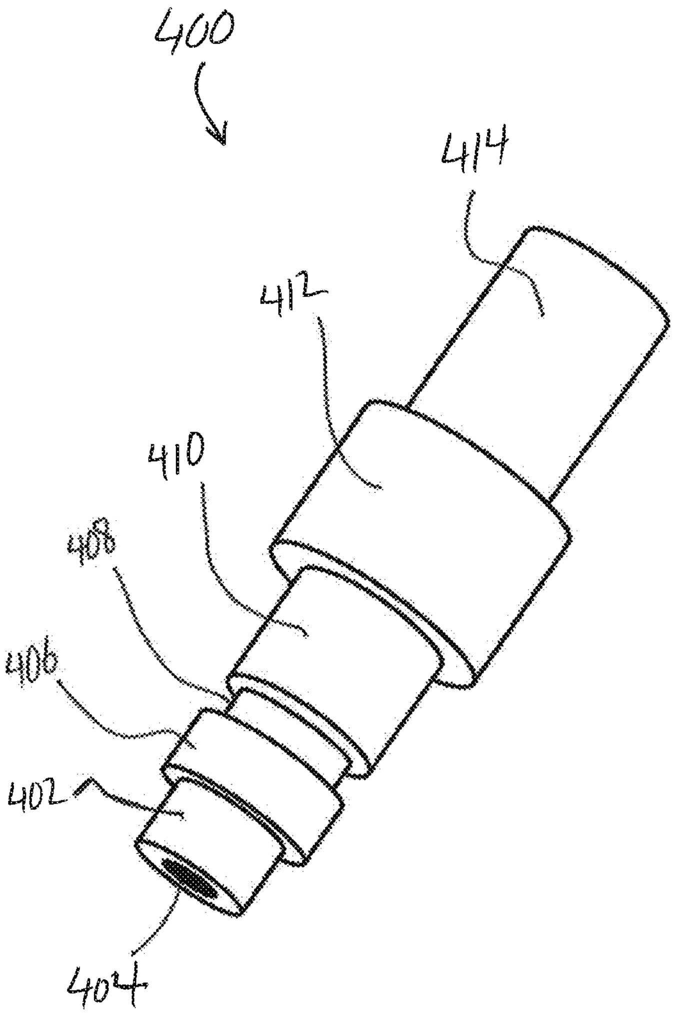
FIG. 4 shows a perspective view of a fire extinguisher charging nozzle according to an exemplary embodiment.

An exemplary embodiment of a recharge nozzle 400 is illustrated in more detail in FIG. 4. As shown, the discharge nozzle 400 comprises a discharge tip 402 that includes a discharge aperture 404. The exemplary discharge aperture having an opening that ranges in size from 0.125 inches to 0.250 inches. Other embodiments may have larger or smaller openings depending upon the intended use or type of fire suppressant solution used. The discharge nozzle 400 also comprises an engagement collar 406, an engagement recess 408, a nozzle body 410, a grip portion 412, and a barb portion 414. The barb portion includes raised ridge portions 314 (illustrated in FIG. 3) that grip the interior of a discharge hose (not illustrated) to which the recharge nozzle 400 is installed. The discharge tip 402 is sized such that it actuates a valve portion of an air disconnect fitting when the recharge nozzle 400 is inserted into an air disconnect fitting such as shown at 312 in FIG. 3. The grip portion 412 may include ridges, knurling, rubber portions, hatching, or other features that may improve a user's grip on the recharge nozzle 400 during the discharge of a pressurized water fire extinguisher to which the recharge nozzle 400 has been installed. To recharge a pressurized water fire extinguisher configured with an exemplary embodiment, a user refills the pressurized water fire extinguisher with water, reinstalls the control valve assembly, and connects the recharge nozzle 400 to an air disconnect fitting 312 by inserting the recharge nozzle 400 into the disconnect fitting such that latching elements (often ball bearings) of the disconnect fitting engage the engagement recess 408, latching the recharge nozzle to the disconnect fitting until released by a user.

Figure 5:
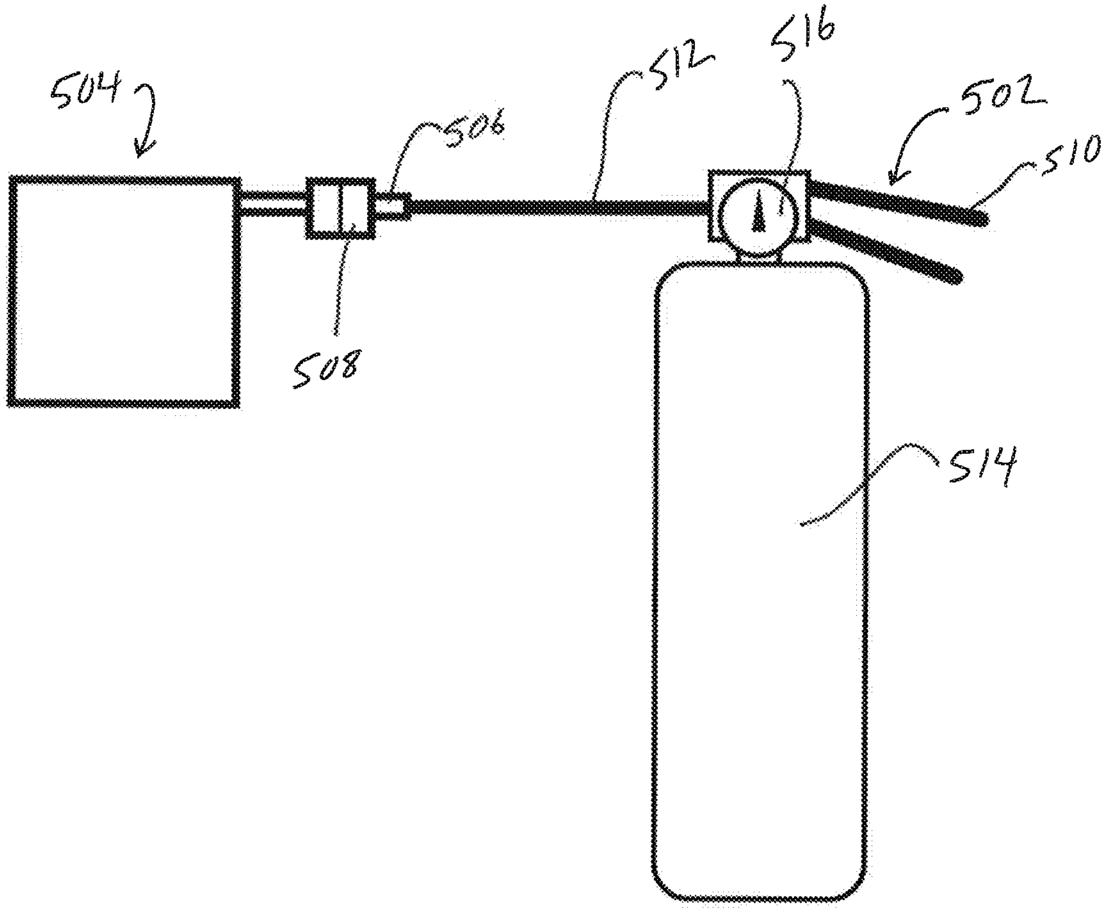
FIG. 5 shows a diagram comprising a pressurized water extinguisher configured with a fire extinguisher charging nozzle connected to a source of compressed air according to an exemplary embodiment.

Referring to FIG. 5, after being refilled with water or a foaming agent, an exemplary pressurized water fire extinguisher 502 is connected to a source of compressed air 504. As illustrated, the pressurized water fire extinguisher 502 comprises a recharge nozzle 506 which is inserted into a quick disconnect connector 508. A user then actuates a valve release handle 510, allowing compressed air to flow from the source of compressed air 504 through a discharge hose 512 and into the storage chamber 514. The user allows the compressed air to flow into the storage chamber 514 until a desired pressure is indicated on the pressure gauge 516. At that point, the user de-actuates the valve release handle 510 and disconnects the recharge nozzle 506 from the quick disconnect connector 508. The water fire extinguisher 502 is now pressurized and ready for use.

Figure 6:
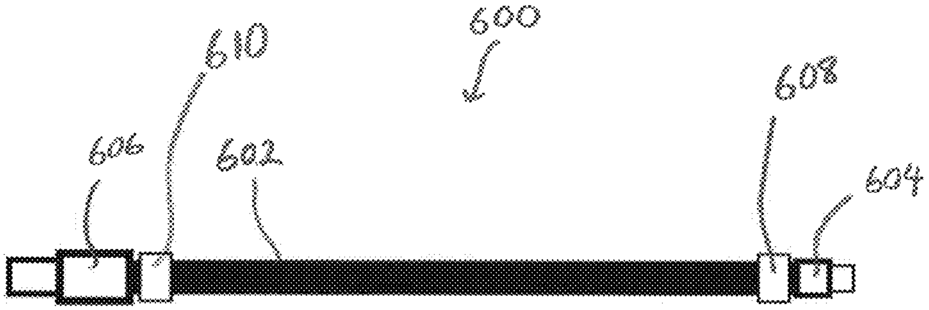
FIG. 6 shows a diagram of a pressurized water extinguisher discharge hose assembly configured with a fire extinguisher charging nozzle according to an exemplary embodiment.

An exemplary hose assembly 600 is illustrated in FIG. 6. As shown, the hose assembly 600 includes a length of flexible hose 602, and a valve fitting 604 which is threaded for installation into the valve body of a fire extinguisher. Certain other embodiments may utilize other methods of attachment to the valve body such as, but without limitation, snap fittings, bayonet fittings, partial thread fittings, interference fit, lock screws, and clamps. The hose assembly 600 also comprises a nozzle assembly 606 adapted as shown in FIG. 4 to allow recharging of the fire extinguisher from a pressurized air supply. As was shown in FIG. 4, the nozzle assembly includes a discharge aperture 404 sized to distribute water or foam from the storage tank of the fire extinguisher. The hose assembly also comprises clamping devices 608 and 610 that secure the valve fitting 604 and the nozzle assembly 606. The clamping devices 608 and 610 may be, without limitation, band clamp assemblies with a worm-drive apparatus for tightening, compressible fittings which are compressed after assembly, spring loaded clams that tighten on the flexible hose 602 to hold barb portions of the valve fitting 604 and the nozzle assembly 606 in contact with an inner diameter of the flexible hose 602.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation or embodiment disclosed herein can be combined with any other implementation or embodiment, and references to "an implementation," "some implementations," "one implementation," "an embodiment," "some embodiments," "certain embodiments," or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation or embodiment can be combined with any other implementation or embodiment, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

What is claimed is:

1. A fire extinguisher comprising:

a storage tank;

a valve body; and a hose assembly, the hose assembly connected to the valve body at a first end and comprising a recharge nozzle at a second end, the recharge nozzle configured with an engagement recess that accepts latching components of an air disconnect fitting.

2. The fire extinguisher of claim 1, wherein the recharge nozzle comprises a discharge tip with an outer diameter adapted to depress a valve portion of the air disconnect fitting such that the valve opens to allow the passage of pressurized air through the disconnect fitting when the recharge nozzle is inserted into the disconnect fitting.

3. The fire extinguisher of claim 1, wherein the discharge nozzle comprises a grip portion.

4. The fire extinguisher of claim 3, wherein the grip portion further comprises gripping features.

5. The fire extinguisher of claim 1, wherein the recharge nozzle has a discharge aperture having a diameter between 0.08 and 0.15 inches.

6. The fire extinguisher of claim 1, wherein the recharge nozzle has a discharge aperture having a diameter less than 0.15 inches.

7. A fire extinguisher recharging nozzle comprising:

a nozzle body having an engagement recess that accepts latching balls of an air disconnect fitting and a discharge tip, the discharge tip having an outer diameter that is sized to depress a valve portion of the air disconnect fitting such that the valve opens to allow the passage of air through the disconnect fitting when the recharging nozzle is inserted into the disconnect fitting; and a discharge aperture having a diameter between 0.08 and 0.15 inches.

8. The fire extinguisher recharge nozzle of claim 7, further comprising a barbed portion extending distally from the discharge aperture portion of the recharging nozzle.

9. The fire extinguisher recharge nozzle of claim 8, further comprising a grip portion located between the barbed portion and the discharge aperture of the recharge nozzle.

10. The fire extinguisher recharge nozzle of claim 9, wherein the grip portion comprises one of ridges, knurling, a rubber portion, or hatching.

11. The fire extinguishing recharge nozzle of claim 7, further comprising:

a flexible hose;

a valve fitting located at a first end of and affixed to the flexible hose;

a valve fitting clamp;

a second end of the flexible hose affixed to a barbed portion of the recharge nozzle; and a nozzle assembly clamp.

12. The fire extinguishing recharge nozzle of claim 11, wherein the recharging nozzle further comprises a grip portion located between the barbed portion and the discharge aperture of the recharge nozzle.

13. The fire extinguishing recharge nozzle of claim 12, wherein the grip portion comprises one of ridges, knurling, a rubber portion, or hatching.

14. The fire extinguishing recharge nozzle of claim 11, wherein the recharge nozzle has a discharge aperture having a diameter between 0.08 and 0.15 inches.

15. The fire extinguishing recharge nozzle of claim 11, wherein the recharge nozzle has a discharge aperture having a diameter less than 0.15 inches.

16. A method of charging a pressurized water fire extinguisher comprising:

filling a storage tank of a pressurized water fire extinguisher with a liquid;

installing a control valve assembly onto the storage tank;
connecting a recharge nozzle configured with an engagement recess that accepts latching components of an air disconnect fitting, the recharge nozzle in fluid communication with the control valve assembly and the air disconnect fitting, the air disconnect fitting in fluid communication with a source of compressed air;
actuating a valve release handle to allow compressed air to flow from the recharge nozzle through the control valve into the storage tank;
monitoring a pressure gauge in fluid communication with the storage tank until a desired pressure indication is attained;
de-actuating the valve release handle; and
disconnecting the recharge nozzle from the air disconnect fitting.

17. The method of claim 16, wherein the recharge nozzle is located on a second end of a flexible hose and a first end of the flexible hose is affixed to valve body portion of a pressurized water fire extinguisher.

18. The method of claim 17, wherein the recharge nozzle comprises a discharge aperture having a diameter between 0.08 and 0.15 inches.

19. The method of claim 17, wherein the recharge nozzle comprises a discharge aperture having a diameter less than 0.15 inches.

* * * * *